(12) United States Patent
Hagen (10) Patent No.: US 9,389,665 B1
(45) Date of Patent: Jul. 12, 2016

(54) POWER WARNING MONITOR SYSTEM AND METHOD

(71) Applicant: John L. Hagen, Marion, IA (US)

(72) Inventor: John L. Hagen, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/745,113

(22) Filed: Jun. 19, 2015

(51) Int. Cl.
| | |
|---|---|
| G06F 1/30 | (2006.01) |
| B64D 43/00 | (2006.01) |
| G06F 11/20 | (2006.01) |
| G06F 11/14 | (2006.01) |
| G06F 11/07 | (2006.01) |

(52) U.S. Cl.
CPC ........ G06F 1/30 (2013.01); B64D 43/00 (2013.01); G06F 11/0724 (2013.01); G06F 11/1469 (2013.01); G06F 11/203 (2013.01); G06F 11/2015 (2013.01); G06F 11/2033 (2013.01); *G06F 1/305* (2013.01); *G06F 2201/84* (2013.01); *G06F 2201/86* (2013.01)

(58) Field of Classification Search
CPC ..... G06F 1/30; G06F 1/3265; G06F 11/0724; G06F 11/2015; G06F 1/305; G06F 11/1438; G06F 11/1441; G06F 11/1469; G06F 11/2033; B64D 43/00

See application file for complete search history.

(56) References Cited

U.S. PATENT DOCUMENTS

| | | | | |
|---|---|---|---|---|
| 4,763,333 A | * | 8/1988 | Byrd | ............... G06F 1/30 365/228 |
| 5,295,258 A | * | 3/1994 | Jewett | ............... G06F 1/12 714/12 |

(Continued)

FOREIGN PATENT DOCUMENTS

| | | | |
|---|---|---|---|
| EP | 668685 A1 | * | 8/1995 |
| EP | 683456 A1 | * | 11/1995 |

(Continued)

*Primary Examiner* — Behrang Badii
*Assistant Examiner* — David Testardi
(74) *Attorney, Agent, or Firm* — Angel N. Gerdzhikov; Donna P. Suchy; Daniel M. Barbieri (57) ABSTRACT

A system and method may monitor a mission critical processor power supply and recover from an intermittent power interruption. A subsystem of one or more processors may be tasked with a power monitoring function enabling processor self-monitoring and recovery. The subsystem monitors the power state of the processors and should a power interruption be sensed, the subsystem may be directed by a memory source external to the primary memory source for normal system operation. The subsystem directs each processing function within each processor to disable and remain disabled until the power interruption ceases. Once the power interruption is complete, the subsystem directs each processing function to refresh and restore to a previous state of full functionality.

20 Claims, 9 Drawing Sheets

(56) References Cited

U.S. PATENT DOCUMENTS

| | | | | |
|---|---|---|---|---|
| 5,317,752 A * | 5/1994 | Jewett | G06F 1/12 | 714/14 |
| 5,327,553 A * | 7/1994 | Jewett | G06F 1/12 | 714/3 |
| 5,799,200 A * | 8/1998 | Brant | G06F 11/1441 | 365/229 |
| 6,262,672 B1 * | 7/2001 | Brooksby | G01D 4/004 | 340/870.05 |
| 6,317,657 B1 * | 11/2001 | George | G06F 1/30 | 365/222 |
| 6,405,107 B1 * | 6/2002 | Derman | G01C 23/005 | 340/3.5 |
| 6,856,045 B1 * | 2/2005 | Beneditz | G06F 1/263 | 307/10.1 |
| 6,901,298 B1 * | 5/2005 | Govindaraj | G05B 19/058 | 700/21 |
| 7,647,474 B2 * | 1/2010 | Bulusu | G06F 1/305 | 712/228 |
| 8,417,995 B2 * | 4/2013 | Davy | G06F 1/30 | 714/25 |
| 8,433,941 B2 * | 4/2013 | Wong | G06F 1/30 | 713/300 |
| 2006/0059385 A1 * | 3/2006 | Atri | G06F 11/1441 | 714/14 |
| 2012/0215971 A1 * | 8/2012 | Harper | G06F 11/1441 | 711/103 |
| 2015/0100183 A1 * | 4/2015 | Youngquist | H02J 4/00 | 701/3 |

FOREIGN PATENT DOCUMENTS

| | | | | |
|---|---|---|---|---|
| EP | 1229430 A1 * | 8/2002 | | G06F 1/3203 |
| JP | 07211066 A * | 8/1995 | | |
| JP | 2001202165 A * | 7/2001 | | |

* cited by examiner

POWER WARNING MONITOR SYSTEM AND METHOD

BACKGROUND

Embodiments of the inventive concepts disclosed herein relate generally to power interruptions within a processor. More particularly, embodiments of the inventive concepts disclosed herein relate to a system and method for monitoring a power state within a processor and taking corrective action should a power event occur.

Short duration power interruptions to a processor power supply may have traditionally required the processor to go through a warm start reset. A traditional warm start may send a signal to the system software that the software should begin certain time saving optimizations to facilitate bringing the system back into normal operation once the power interruption is complete. A warm start may attempt a quick restart of the system capabilities to ensure nearly continuous supply of information to a system.

Similarly, a traditional cold startup procedure may depower a system for a longer period than a warm start in order to attempt to regain full processor operation. This lengthy cold startup may reflect an attempt at a system shutdown followed by a restart to attempt to regain full processing capacity.

In a processing system supporting a mission critical display, cold starts may be reason to discontinue authorization and use of a processing system as a lack of a critical display for any substantial length of time may be unacceptable to an operator. In addition, warm starts causing a delay in display availability for even a short duration may be cause for discontinuing use of the processor. As mission critical display requirements may increase in number and complexity, and a proportional increase in processor support capability, operator reliance on continuous operation of these mission critical display systems may also increase.

Use of multi-core processors (e.g., Freescale T2080) in mission critical avionics with embedded hypervisors may allow simultaneous hosting of multiple operating system images. The number of images and their respective size may create a delay in meeting a timing requirement for recovering from a power interruption event. Traditional warm start architecture may meet the timing requirements for the short term but does not scale well and will most likely be unable to meet those requirements in the long term.

Therefore, a need remains for a power monitoring system to ensure mission critical display processors remain adequately operational in the event of a power interruption. Where processor power supplies may be less than perfect, such a power monitoring system and method may offer the operator a continuous operational mission critical display system to enhance operator awareness and increase the operator's ability to successfully accomplish an assigned mission.

SUMMARY

In one aspect, an embodiment of the inventive concepts disclosed herein is directed to a system for mission critical processor power event recovery, comprising a mission critical processor configured for controlling a mission critical display, the mission critical processor including a core processor powered by a mission critical processor power supply. The system may include a first memory source coupled with the mission critical processor and storing non-transitory processor readable program code to cause the mission critical processor to execute a normal operation of the mission critical display. The system may include a power warning monitor coupled with the mission critical processor and with the first memory source, and configured for receiving an indication of a power anomaly in the mission critical processor power supply.

The system may include a capacitive power source coupled with the mission critical processor power supply and configured for powering the mission critical processor and the power warning monitor during the power anomaly. The system may include a second memory source coupled with the power warning monitor and storing non-transitory processor readable program code to cause the power warning monitor to execute a power event operation and recovery of the mission critical processor during the power anomaly, the second memory source separate from the first memory source.

The power warning monitor may be further configured for accessing the non-transitory processor readable program code from the first memory source and the second memory source and for receiving the indication of the power anomaly. The power warning monitor may further notify a user of the mission critical display of the power anomaly, save to the second memory source an execution context of a thread associated with the core processor, and redirect the thread to receive commands from the second memory source. The power warning monitor may also command the thread to enter a power warning loop to preserve a status of the thread and force the first memory source to execute a self-refresh, The power warning monitor may be further configured for monitoring 1) the mission critical processor power supply for an end to the power anomaly and 2) a level of the capacitive power source, sensing an indication of the end to the power anomaly. If the monitoring reveals the end to the power anomaly, the power earning monitor may force the first memory source to cease the self-refresh, redirect the thread to receive commands from the first memory source, restore the thread with the saved execution context, and restore the mission critical display with information processed by the thread.

In a further aspect embodiments of the inventive concepts disclosed herein are directed to a system wherein the mission critical processor is a multi-core processor including at least two core processors, each core processor of the at least two core processors further including a thread.

In a further aspect embodiments of the inventive concepts disclosed herein are directed to a system wherein receiving an indication of a power anomaly further comprises receiving an indication from a hardware based interrupt request (IRQ).

In a further aspect embodiments of the inventive concepts disclosed herein are directed to a system wherein the user is a flight crewmember and the mission critical display is a primary flight display for controlling an aircraft.

In a further aspect embodiments of the inventive concepts disclosed herein are directed to a system wherein the power anomaly is one of a voltage anomaly, a phase anomaly, and a frequency anomaly, and further including notifying the user of an exhaustion of the mission critical display before the level of the capacitive power source is zero.

In a further aspect embodiments of the inventive concepts disclosed herein are directed to a system wherein the execution context includes a parameter associated with a normal operation of the thread.

In a further aspect embodiments of the inventive concepts disclosed herein are directed to a system wherein the first memory source is a memory controller supporting a self-refresh functionality and the second memory source is a core platform cache management static random access memory, a NOR flash read-only memory, a NAND flash memory, a magnetoresistive random-access memory, or a static RAM module.

In a further aspect embodiments of the inventive concepts disclosed herein are directed to a system wherein the power warning monitor is a field programmable gate array associated with the mission critical processor.

In a further aspect embodiments of the inventive concepts disclosed herein are directed to a method for mission critical processor power warning. The method may comprise monitoring a mission critical processor power supply for a power anomaly the mission critical processor power supply coupled with a mission critical processor configured for controlling a mission critical display, the monitoring via a power warning monitor coupled with the mission critical processor, and receiving an indication of the power anomaly, notifying a user of the mission critical display of the power anomaly.

The method may include saving to a second memory source an execution context of a thread associated with a mission critical processor, the second memory source configured for storing non-transitory processor readable program code to cause the power warning monitor to execute a power event operation and recovery of the mission critical processor during the power anomaly, the second memory source separate from a first memory source, the first memory source configured for storing non-transitory processor readable program code for causing the mission critical processor to execute a normal operation of the thread.

The method may further include redirecting the thread to receive commands from the second memory source, commanding the thread to enter a power warning loop to preserve a status of the thread, forcing the first memory source to execute a self-refresh, monitoring 1) the mission critical processor power supply for an end to the power anomaly and 2) a level of a capacitive power source, the capacitive power source powering the mission critical processor and the power warning monitor during the power anomaly. The method may further sense an indication of the end to the power anomaly. If the monitoring reveals the end to the power anomaly the method may force the first memory source to cease the self-refresh, redirect the thread to receive commands from the first memory source, restore the thread with the saved execution context, and restore the mission critical display with information processed by the thread.

In a further aspect embodiments of the inventive concepts disclosed herein are directed to a method for multiple core processor power event recovery. The method may comprise monitoring a mission critical processor power supply for a power anomaly, the mission critical processor power supply coupled with a mission critical multi-core processor, the mission critical multi-core processor configured for controlling a mission critical display. The method may also designate a primary thread associated with a core of the mission critical multi-core processor as a power warning monitor.

The power warning monitor may be configured for executing non-transitory processor readable program code stored within a second memory source during the power anomaly. Here, the non-transitory processor readable program code may include the steps of receiving an indication of the power anomaly, notifying a user of the mission critical display of the power anomaly, and saving to the second memory source an execution context of a local thread associated with the mission critical multi-core processor.

The second memory source may be configured for storing non-transitory processor readable program code to cause the power warning monitor to execute a power event operation and recovery of the mission critical multi-core processor during the power anomaly. The second memory source separate from a first memory source, the first memory source configured for storing non-transitory processor readable program code to cause the mission critical processor to execute a normal operation of the local thread. The power warning monitor may be further configured for redirecting the local thread to receive commands from the second memory source, and commanding the local thread to enter a power warning loop to preserve a status of the local thread, forcing the first memory source to execute a self-refresh.

The power warning monitor may further be configured for monitoring 1) the mission critical processor power supply for an end to the power anomaly and 2) a level of a capacitive power source, the capacitive power source configured for powering the power warning monitor during the power anomaly, sensing an indication of the end to the power event, forcing the first memory source to cease the self-refresh, redirecting the local thread to receive commands from the first memory source, restoring the local thread with the saved execution context, and restoring the mission critical display with information processed by the local thread.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the inventive concepts disclosed herein may be better understood by those skilled in the art by reference to the accompanying figures in which.

DETAILED DESCRIPTION

Reference will now be made in detail to the presently preferred embodiments of the inventive concepts disclosed herein, examples of which are illustrated in the accompanying drawings.

The following description presents certain exemplary embodiments of the inventive concepts disclosed herein. However, the inventive concepts disclosed herein may be embodied in a multitude of different ways as defined and covered by the claims. In this description, reference is made to the drawings wherein like parts are designated with like numerals throughout.

Overview

Embodiments of the inventive concepts disclosed herein are directed to a system and method for processor power monitoring and recovery from an intermittent power interruption. A subsystem of one or more processors may be tasked with a power monitoring function enabling processor self-monitoring and recovery. The subsystem monitors the power state of the processors and should a power interruption be sensed, the system may direct each processing function within each processor to disable and remain disabled until the power interruption ceases. Once the power interruption is complete, the subsystem directs each processing function to refresh and restore to a previous state of full functionality.

Embodiments of the inventive concepts disclosed herein may apply to a power warning monitoring capability applied to a single processor as well as a system maintaining more than one processor. A single core processor and a multi-core processor may find direct benefit from embodiments disclosed herein. In one embodiment, a processor system employing four multi-core processors which supply information to a primary mission critical data display to an operator may be directly supported by embodiments of the inventive concepts disclosed herein.

In some embodiments, the power warning monitor disclosed herein may operate to monitor a processor system supplying data to a primary flight display within a cockpit of an aircraft. The primary flight display may be one mission critical asset required to provide mission critical data to a pilot for safe aircraft operation. The power warning monitor disclosed herein may operate to sense a power event and apply a series of steps to enable the processor system to continuously provide mission critical data to the mission critical displays.

In embodiments, the power warning monitor disclosed herein may place each processor in a recoverable state precluding them from communicating with their normal controller. Once each processor is no longer reacting to normal controller commands, a controller Random Access Memory (RAM) device may be placed into self-refresh mode and the contents of memory preserved as long as residual capacitance power is being received by the normal controller. Should the power event conclude and the ram contents are preserved, the processors are allowed to resume normal powered operation and receive commands again from the normal controller.

| Reference Chart | |
|---|---|
| Ref. No. | Description |
| 100 | System for Mission Critical Display |
| 110 | Power Supply |
| 146 | Power Warning Monitor |
| 120 | Mission Critical Display System |
| 122 | Power Supply Module |
| 124 | Power Warning Interrupt (IRQ) |
| 136 | Hardware Monitor FPGA |
| 126 | Multicore Processor Module |
| 128 | Graphics Card |
| 130 | Display Screen |
| 142 | Capacitance Module |

| Reference Chart | |
|---|---|
| Ref. No. | Description |
| 200 | Processor Based System |
| 202 | Core 0 |
| 204 | Core 1 |
| 206 | Core 2 |
| 208 | Core N |
| 210 | Core Connection |
| 212 | Core Platform Cache Module |
| 214 | Double Data Rate Memory Controller |
| 220 | Primary PWM Thread |
| 300 | Processor Based Process |
| 400 | Processor Based Logic |
| 402 | Nominal Execution State |
| 404 | Power Warning IRQ? |
| 406 | IRQ Context Save |
| 408 | Fetch Redirect |
| 410 | PWM SRAM Execute |
| 412 | DDR Force Self-Refresh |
| 414 | Event Monitor |
| 416 | Power Event Complete? |
| 418 | Command DDR Out Self-Refresh |
| 420 | Fetch Redirect |
| 422 | Restore IRQ Context |
| 430 | Operating system DDR Execution |
| 440 | Notification |
| 500 | Thread Based System |
| 600 | Thread Based Process |
| 602 | Thread Based Designated Core and Thread |
| 700 | Thread Based Logic Flow |
| 702 | Nominal Execution State |
| 704 | Power Event? |
| 706 | Disable Threads |
| 708 | Force DDR Self-Refresh |
| 710 | Setup and Monitor INIAn |
| 712 | Power Event Complete? |
| 714 | Command DDR Self-Refresh Off |
| 716 | Enable Threads |
| 718 | Restore IRQ Content |
| 720 | Normal OS Execution |
| 730 | Normal OS Execution |
| 750 | Notification |
| 800 | Aircraft Display Embodiment |
| 900 | Exemplary Timeline |
| 902 | Time 0 Power Event |
| 904 | Time 1 |
| 906 | Time 2 |
| 912 | LRU Holdup |
| 914 | RAM Holdup |
| 916 | Power Drained |

Figure 1:
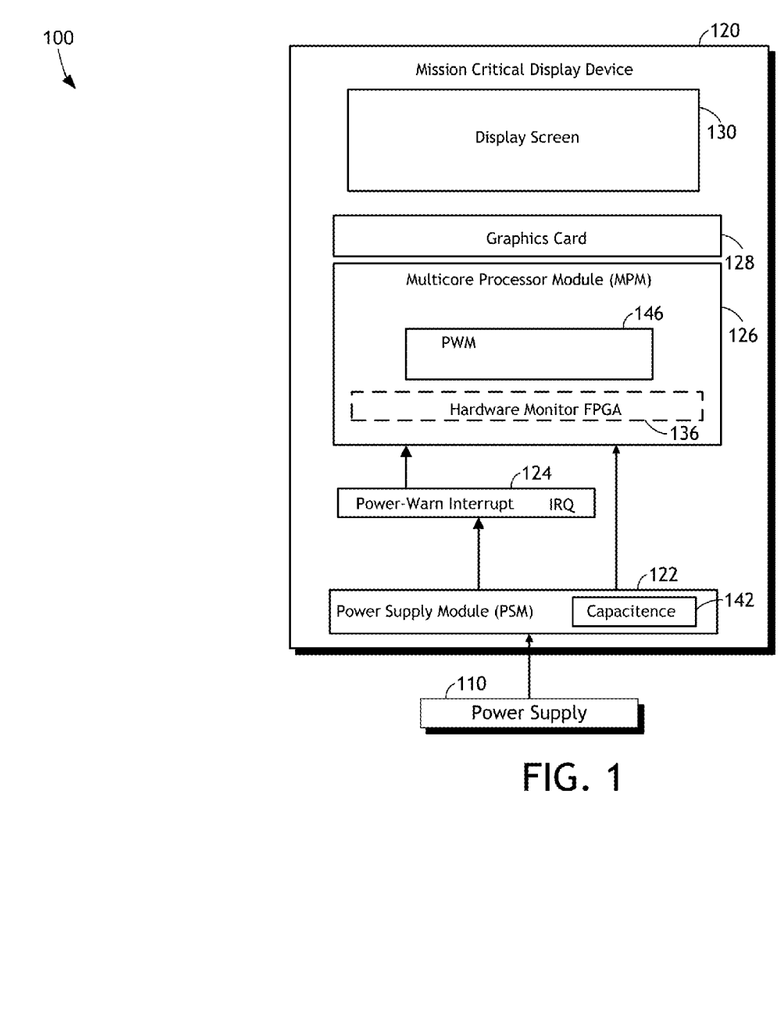
FIG. 1 is a diagram of a mission critical display system and an associated power warning monitor in accordance with an embodiment of the inventive concepts disclosed herein.

Referring to FIG. 1, a diagram of a mission critical display system and an associated power warning monitor in accordance with an embodiment of the inventive concepts disclosed herein is shown. A system for mission critical display 100 may include a mission critical display device 120 electrically powered by a power supply 110 for operation. A Power Warning Monitor (PWM) 146 may operate to monitor the power supply 110 and execute steps associated with the inventive concepts disclosed herein to ensure continuous operation of the mission critical display 120.

The mission critical display device 120 may include a Power Supply Module (PSM) 122, a Multicore Processor Module (MPM) 126, a graphics card 128 and a display screen 130. In addition to the PWM within the MPM 126, the system for mission critical display 100 may include an optional hardware Monitor Field Programmable Gate Array (FPGA) 136.

Within the PSM 122, a capacitance module 142 may retain an amount of power to sufficiently power the MPM 126 during a power event. A Power-Warning Interrupt Request (IRQ) 124 may operate as a signal from the PSM 122 to the MPM 126 that a power event is occurring.

In normal operation, electrical power may flow from the power supply 110 through the PSM 122 to the MPM 126 for continuous operation of the display screen 130. The PSM may actively monitor the electrical power for any anomaly which may impede the MPM from successful operation supplying the graphics card 128 and the display screen 130 with data for continuous operation of the mission critical display device 120 for display of mission critical information to an operator. For example, the operator may be a pilot of an aircraft and the power supply may be one or more generators onboard the aircraft. The mission critical display device may be the attitude indicator within the cockpit of the aircraft.

Should the PSM 122 sense an anomaly in the power supply 110, it may determine the presence of a power event. As used herein, a power event may be defined as any power anomaly (e.g., volts, frequency and phase, etc.) which may impede proper operation of the mission critical display device 120. For example, a complete power loss from the power supply 110 may cause the PSM to declare a power event and send the IRQ 124 to the MPM 126. Also for example, a slight drop in voltage of the power supply may also trigger the PSM to send the IRQ 124 to the MPM 126.

The MPM 126 may function to supply the processing capability to the mission critical display device 120 via stored program code for operation and function of the mission critical display device 120. Optionally and within the MPM 126, a hardware monitor field programmable gate array (FPGA) 136 may be employed as an additional or optional monitor of the electrical power supply 110. The FPGA 136 may assume responsibility of notifying the MPM 126 of the start and end of a power event.

In one exemplary application, the power supply 110 may be a constant speed drive (CSD) within an aircraft engine generator supplying electrical power to each system onboard an aircraft. The constant speed drive may supply nearly uninterrupted electrical power to the aircraft mission critical display device 120. However, there may be occasions where the electrical power may be interrupted for a period of time. For example, a faulty CSD or impending failure of the CSD may cause a short duration interruption in electrical power supplied to each onboard system. In this situation, embodiments of system 100 may operate to maintain the mission critical display device 120 functional throughout each power interruption event.

For example, (see also FIG. 9) for very short power interruptions (e.g., 0-200 ms), the capacitance module 142 may keep the MPM 126 functioning with no observable effects by the operator. In moderate power interruptions, the observable effect may be blank display screen 130 (>200 ms) but recovery may be not noticeable by the operator (e.g., a blink of the eye). In long power interruptions (>2200 ms), the mission critical display device 120 may perform a cold start with noticeable (e.g., seconds) of a blank display screen 130. The PWM 146 may target the moderate power interruption to ensure the mission critical display device 120 remains powered and capable of supplying the mission critical data to the operator.

Within the PSM 122, the capacitance module 142 may provide a residual power supply for a short period during which the system 100 may operate to restore full function of the mission critical display device 120. The PSM 122 may regulate the power supply 110 to increase power supply stability (e.g., 18 VDC). The MPM 126 may further break down the PSM 122 power into components (e.g., 12 Vdc, 5 Vdc 3.3 Vdc) for each of the card components (e.g., graphics card 128). As a result, there may be one or more hardware locations where the capacitance module 142 may be physically incorporated within the system 100. In this manner, there exists a limited period within which embodiments of the system 100 may be powered to function and restore full mission critical display device 120 function before the capacitance module 142 power supply is exhausted. Skilled artisans may recognize varying sizes of capacitance module 142 may be incorporated herein to lengthen the time available to power the MPM 126 during a power event.

In addition, a processor based on a reduced instruction set computing (RISC) architecture may function within the scope of the inventive concepts disclosed herein. An Advanced RICS Machine (ARM) architecture based processor may employ a single thread within the scope of the embodiments disclosed herein to function as the PWM 146 to function to monitor the power supply 110 available to the plurality of processors within the overall system.

Figure 2:
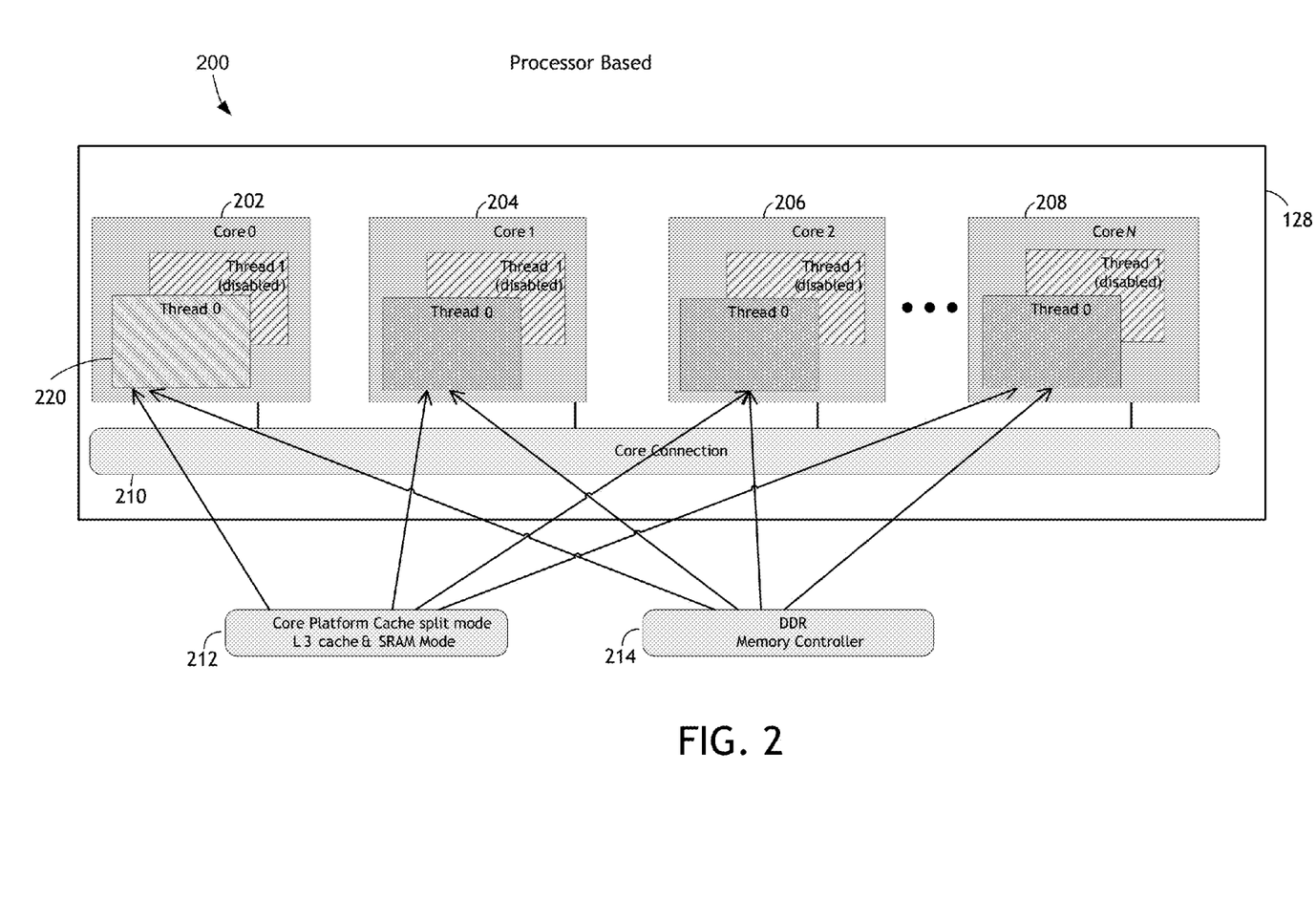
FIG. 2 is a diagram of a processor based power warning monitor in accordance with an embodiment of the inventive concepts disclosed herein.

Referring to FIG. 2, a diagram of a processor based power warning monitor in accordance with an embodiment of the inventive concepts disclosed herein is shown. A processor based system 200 may be implemented to carry out function of the PWM 146 including directing one or more processors including one or more cores to carry out the steps of the PWM 146.

Each core including core0 202, core1 204, core2 206 and coreN 208 may employ a plurality of threads to function within an architecture of a single core and a multi-core processor. Each core may sustain one or more of the plurality of threads to operate within the desired function of the architecture. For example, a thread may function to provide a display function for display of the mission critical information on the display screen 130.

A core connection 210 may operate to provide data connectivity between each core 202, 204, 206, and 208, and each of the other cores within the architecture. A core platform cache module 212 may provide one or more threads per core with instructions for operation of the PWM 146. The core platform cache module 212 may provide a single and separate source for the instructions provided to the threads during a power event operation. During normal operation, a Double Data Rate (DDR) memory controller 214 may operate to provide each of the threads with hypervisor and operating system instruction and fetching source for routine operations. For example, the DDR memory controller 214 may supply routing data and source code for an exemplary horizon display on the primary flight mission critical display device 120 of an aircraft.

In embodiments, each core may employ one or more threads within each core as a local PWM 146. Also, the system 200 may designate one thread within any core as a primary PWM thread 220. Here, the exemplary thread0 of core0 has been designated by the system 200 as the primary PWM thread 220. The primary PWM thread 220 may be enabled by the core platform cache module 212 to provide commands to each of the other threads operating as local PWM threads and to the DDR memory controller 214 during power event operations.

During normal operation, each local PWM thread may also fetch instructions from the core platform cache module 212 for PWM 146 operation. In some embodiments, the core platform cache module 212 may be configured to operate in a dual mode of L3 cache and SRAM to enable instructions from one or both of the L3 cache and the SRAM. The primary PWM thread 220 may receive an input from the IRQ 124 and take action based on the instructions fetched from the SRAM mode of the core platform cache module 212. The core platform cache module 212, acting separately from the DDR memory controller 214, may be, for example, a NorFlash read-only memory, a NAND Flash memory, a magnetoresistive random-access memory (MRAM), or Static RAM memory.

A power event may be indicated to the MPM 126 by a signal from the IRQ 124 to one or more of the cores within the MPM 126. During the power event, the primary PWM thread 220 may command each local PWM threads to take action using a PWM IRQ command sent to each thread via the core connection 210.

As the priority PWM thread 220 receives the IRQ 124, the PWM thread 220 commands each thread to execute an IRQ context save and to redirect operational instruction fetching from the DDR memory controller 214 (normal operations) to the core platform cache module 212 (power event operations). The priority PWM thread 220 may also follow the PWM SRAM execution steps from the core platform cache module 212 and command the DDR memory controller 214 to self-refresh then the priority PWM thread 220 may continue to monitor the power event for power event completion. Should the power event continue and the capacitance module 142 become exhausted, each thread within each core including the priority PWM thread 220 thread may become unpowered and discontinue operation.

Should the optional FPGA 136 be employed by the system 100, the FPGA may complete the task of putting the DDR memory controller 214 into and out of the self-refresh mode.

However, should the power event end and the power supply 110 is properly restored, the priority PWM thread 220 may command the DDR memory controller 214 out of the self-refresh mode and command each thread to restart using the saved thread specific restart context information and initial instructions. Each thread may then resume normal operation and communication with the DDR memory controller 214.

Each local PWM thread may react to the commands of the priority PWM thread 220 during the power event. The PWM IRQ command from the primary PWM thread 220 to each of the local PWM threads in the system 200 may command each of the threads to discontinue their normal interface with the DDR memory controller 214 and redirect instruction fetching from the core platform cache module 212.

Each local PWM thread within each core 202-208 may then be under the direction of the instructions fetched from the core platform cache module 212 during the power event. During the power event, each core may operate in a conservation mode of a power warning loop SRAM awaiting further instruction. Once the power event is complete, each core may redirect instruction and return to the DDR memory controller 214 for further instructions, restore each IRQ context and begin normal OS execution as directed by the instructions obtained from the DDR memory controller 214.

During the PW loop SRAM of each local PWM thread, the system 200 commands no lengthy reset operation and no time consuming reload of the operating system. This pause in execution may be considerably faster and allow each thread to resume normal operation without a hesitation in the mission critical display device 120.

Figure 3:
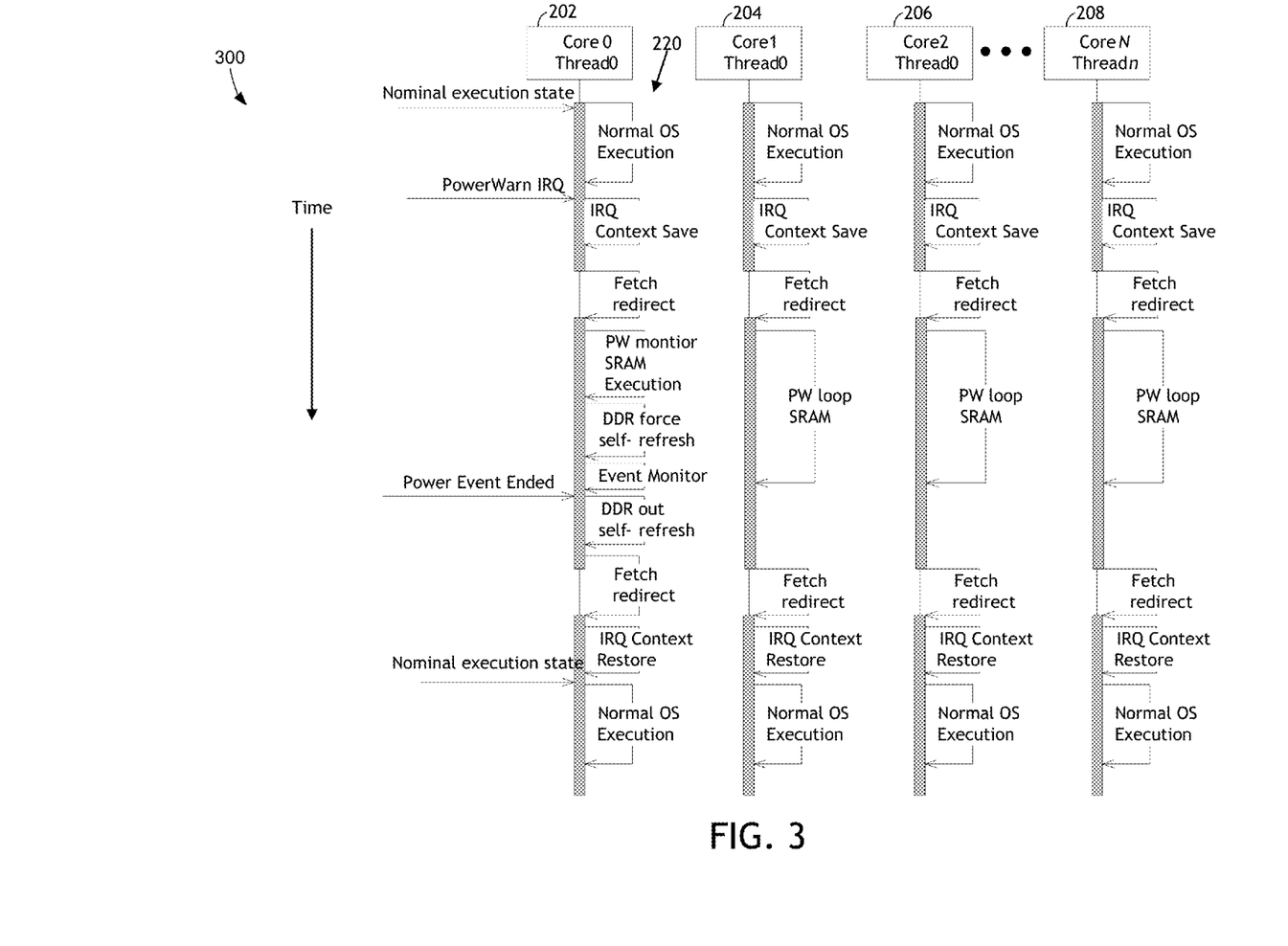
FIG. 3 is a processor flow diagram of a processor based power warning monitor in accordance with an embodiment of the inventive concepts disclosed herein.

Referring to FIG. 3, a processor flow diagram of a processor based power warning monitor in accordance with an embodiment of the inventive concepts disclosed herein is shown. A processor flow 300 may be indicated with time on the left flowing from top to bottom and each step of each of the priority PWM thread 220 and the local PWM threads indicated.

Normal Operating System (OS) execution may be the normal operational state of each of the threads both before and after the power event. The processor flow 300 indicates a power warn IRQ 134 as the signal to the priority PWM thread 220 that a power event is in progress. The same IRQ 124 may signal to the priority PWM thread 220 that the power event is over.

The priority PWM thread 220 steps may include normal OS execution, the IRQ context save at the indication of the power event, a fetch redirect to fetch instructions from the core platform cache module 212 and the PWM SRAM execution steps as directed by the newly fetched instructions. The priority PWM thread 220 may force the DDR memory controller 214 into the self-refresh mode and monitor the power event for completion. Once the power event is complete, the priority PWM thread 220 may then force the DDR memory controller 214 out of the self-refresh mode, fetch redirect from the DDR memory controller 214 and restore the IRQ context back to nominal execution state. Once back to normal OS execution, the priority PWM thread 220 may operate to continue normal operations until reception of a next IRQ 124 signal.

Each local PWM thread may, as above, operate with normal OS execution as directed by the DDR memory controller 214 until reception of the PWM IRQ from the priority PWM thread 220. The local PWM threads may then perform the IRQ context save and fetch redirect to the core platform cache module 212 for the power event instructions. During the power event, the local PWM threads may operate in the PW loop SRAM until further notice from the priority PWM thread 220. Once notified, the local PWM threads may fetch redirect and restore the IRQ context and continue normal OS operation as before the power event.

Figure 4:
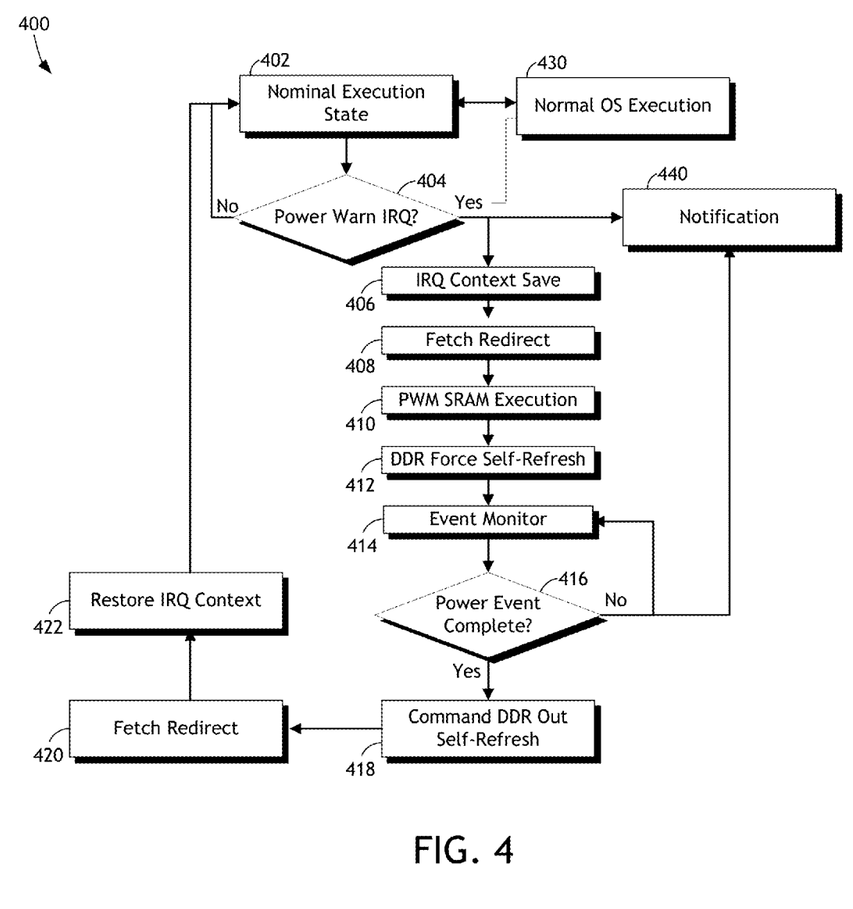
FIG. 4 is a logic flow diagram of a method for processor based power warning monitor in accordance with one embodiment of the inventive concepts disclosed herein.

Referring to FIG. 4, a logic flow diagram of a method for processor based power warning monitor in accordance with one embodiment of the inventive concepts disclosed herein is shown. Method flow 400 may include a step 402 of nominal execution state with an associated normal OS execution at a step 430. A query 404 may determine if a power warning IRQ is received and if the result of query 404 is negative, the logic flow may proceed to the nominal execution step 402. However, should the result of query 404 be positive, the method flow 400 may proceed to a step 406 of IRQ context save and a notification step 440 to notify an operator of the power warning event. For example, the notification step 440 may further include a visual or non-visual notification to an operator as well as an entry in an event log for further action by an administrator or a maintenance technician.

The method flow 400 may include a step 408 comprising a fetch redirect and a step 410 of PWM SRAM execution by the local PWM threads. The method flow 400 may force the DDR into a self-refresh mode at a step 412 and monitor the power event for conclusion at a step 414. A query 416 may determine if the power event is complete and should the result be negative, the method may return to the event monitor step 414 as well as proceed to the notification step 440 to provide an additional notification. Should the result of the query 416 be positive, the method flow 400 may proceed to a step 418 to command the DDR out of self-refresh, to fetch redirect at a step 420, and restore the IRQ context to each thread at a step 422 before returning to the nominal execution state 402.

Figure 5:
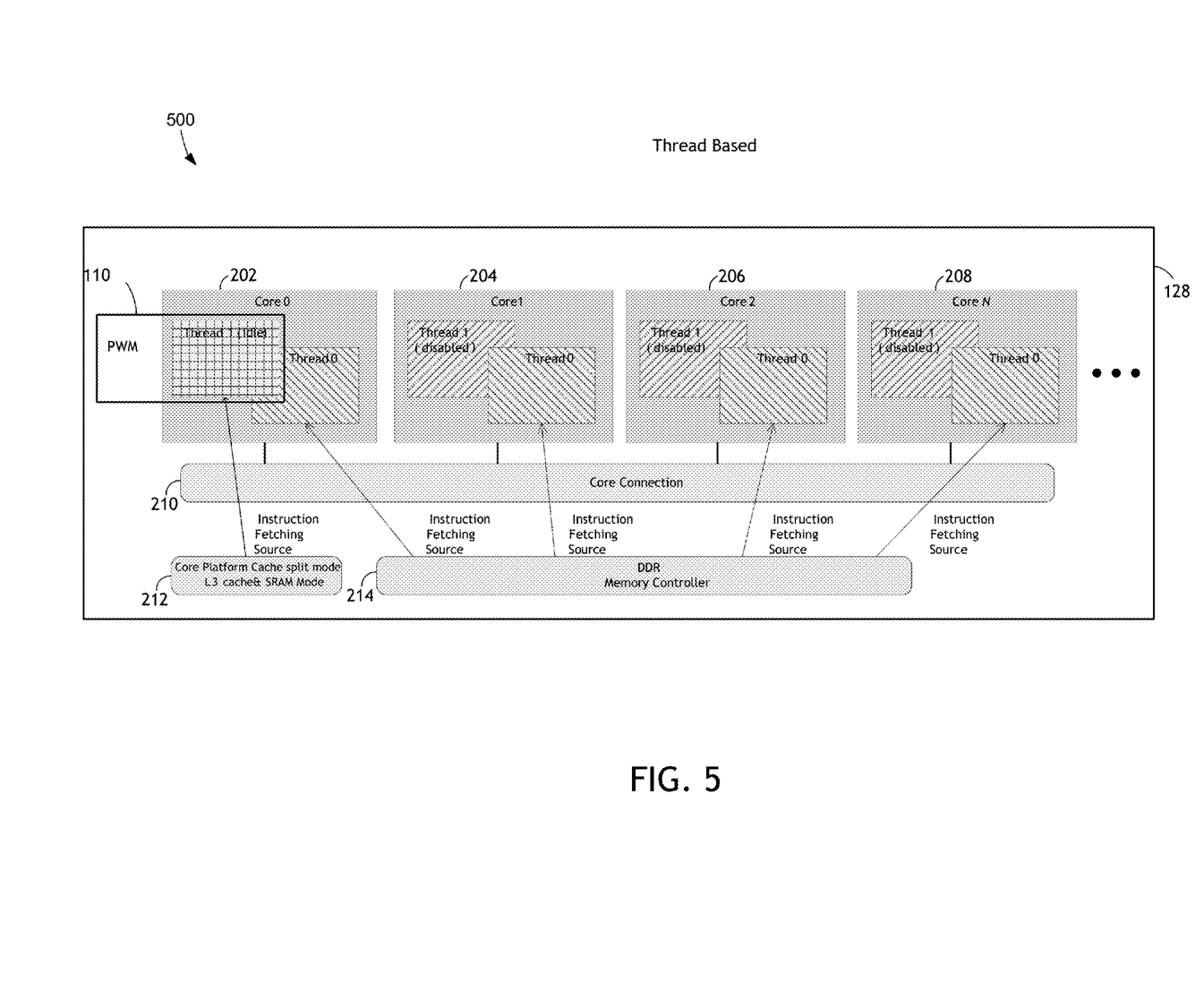
FIG. 5 is a diagram of a thread based power warning monitor exemplary of one embodiment of the inventive concepts disclosed herein.

Referring to FIG. 5, a diagram of a thread based power warning monitor exemplary of one embodiment of the inventive concepts disclosed herein is shown. Thread based system 500 may operate to dedicate one of the threads (e.g., virtual cores) within one core to operate as the PWM 146. Here, an exemplary thread1 of core0 202 may be the dedicated thread to operate as the PWM 146. In embodiments, any single thread from any core or cores may be designated as the dedicated thread assigned the task of operating as the PWM 146. In addition, core processors running multiple cores (e.g., greater than two) may dedicate additional threads to operate as the PWM 146 should the task be too great for a single thread to manage. For example, in one system, an exemplary thread 18 of core eight may operate as the PWM 146 in an exemplary system while the system 500 may operate using thread1 of core0 202 to accomplish the PWM 146 tasks.

Thread1 of core0 202 may receive PWM 146 instructions from the core platform cache module 212 and is tasked by the core platform cache module 212. The thread1 of core0 202 receiving instructions from the core platform cache module 212 may remain as a separate function from the remaining cores their associated threads which remain controlled by the DDR memory controller 214. In embodiments, a processor or processors maintaining one or more threads within one or more cores may function within the scope of these inventive concepts. Any processor maintaining more than one thread may function to task a single thread to perform the duties of the PWM 146.

In operation, the designated thread PWM 146 may fetch instructions from the core platform cache module 212 for PWM 146 operation. In some embodiments, the core platform cache module 212 may be configured to operate in a dual mode of L3 cache and SRAM to enable the thread1 of core0 202 to fetch instructions from one or both of the L3 cache and the SRAM. The PWM 146 may receive an input from the IRQ 124 and act upon the IRQ 124 notification of a power event.

In embodiments, the PWM 146 may command each thread to take action using a PWM IRQ command sent to each thread via the core connection 210. This PWM IRQ command from the PWM 146 to each of the threads in the system (e.g., a multi-cast inter-processor IRQ) commands each of the threads to discontinue interfacing with the DDR memory controller 214, pass back unique restart context information from each thread to the PWM 146, perform any necessary cache preparations, and fall into a quiescent wait loop. The PWM 146 may then command the DDR memory controller 214 to enter a self-refresh mode and wait for further instructions. At this point, the PWM 146 may disable each thread and also enter a waiting state for the power event to end. Should the power event continue and the capacitance module 142 becomes exhausted, each thread within each core including the PWM 146 thread may become unpowered and discontinue operation.

However, should the power event end and the power supply 110 is restored, the PWM 146 may command the DDR memory controller 214 out of the self-refresh mode and command each thread to restart using the unique thread specific restart context information and initial instructions. This restart command may include an initial instruction address for a successful restart of each thread within each core to return to an operational state and resume execution similar to the operational state of the thread prior to power event. Each thread may then resume normal operation and communication with the DDR memory controller 214.

As above, during the quiescent loop of each thread there is no lengthy reset operation and no time consuming reload of the operating system commanded by the PWM 146.

Figure 6:
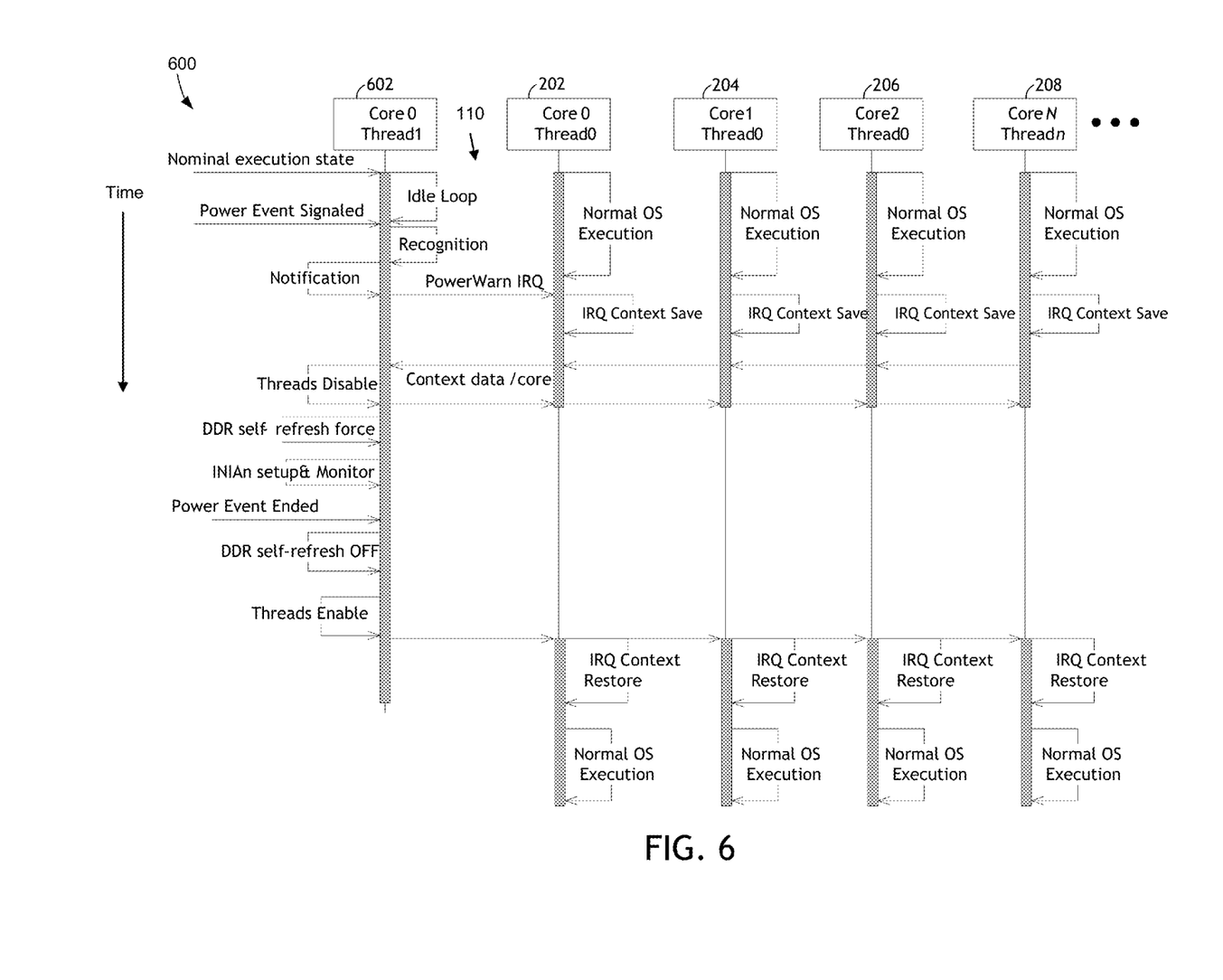
FIG. 6 is a processor flow diagram of a thread based power warning monitor exemplary of one embodiment of the inventive concepts disclosed herein.

Referring to FIG. 6, a processor flow diagram of a thread based power warning monitor exemplary of one embodiment of the inventive concepts disclosed herein is shown. Process flow 600 may detail the steps the PWM 146 may take to ensure the system 100 may adequately recover from an intermittent power event. As time may be indicated from top to bottom of the process flow 600, each step of the PWM 146 may be indicated by the steps while a time based status of each thread may be indicated in parallel below each thread.

The thread1 of core zero 602 may operate as the PWM 146 to continue monitoring the power supply 110 as the other threads may be disabled during the power event. Before a power event, a normal execution state may exist including an idle loop for the PWM 146 and a normal operating system execution of each thread within each core. Operating system execution may include normal operation for each thread executing commands issued by the DDR memory controller 214.

As a power event is signaled via the IRQ 124, the PWM 146 may recognize the power event as an event requiring PWM 146 action. A notification to each thread via the PWM IRQ via the core connection 210. The PWM 146 may command the threads to disable, force the DDR memory controller 214 into a self-refresh, and setup and monitor the initial start information addresses for each thread using the unique restart context information. In embodiments, a thread Initial Next Instruction Address (INIA) may be one information address the process flow may setup and monitor. As the power event may end, the PWM command the DDR memory controller out of the self-refresh mode and enable each thread using the unique restart context information previously received from each thread.

A timeline for each thread may include the operating system execution of a specific command issued by the DDR memory controller 214. At the reception of the PWM IRQ, each thread may execute an IRQ context save and respond to the PWM 146 command to enter the quiescent loop until commanded otherwise or the power event continues and the capacitance module 142 is exhausted. Once the power event may cease, each thread may respond to the IRQ context restore command and begin operating system execution as directed by the DDR memory controller 214.

Figure 7:
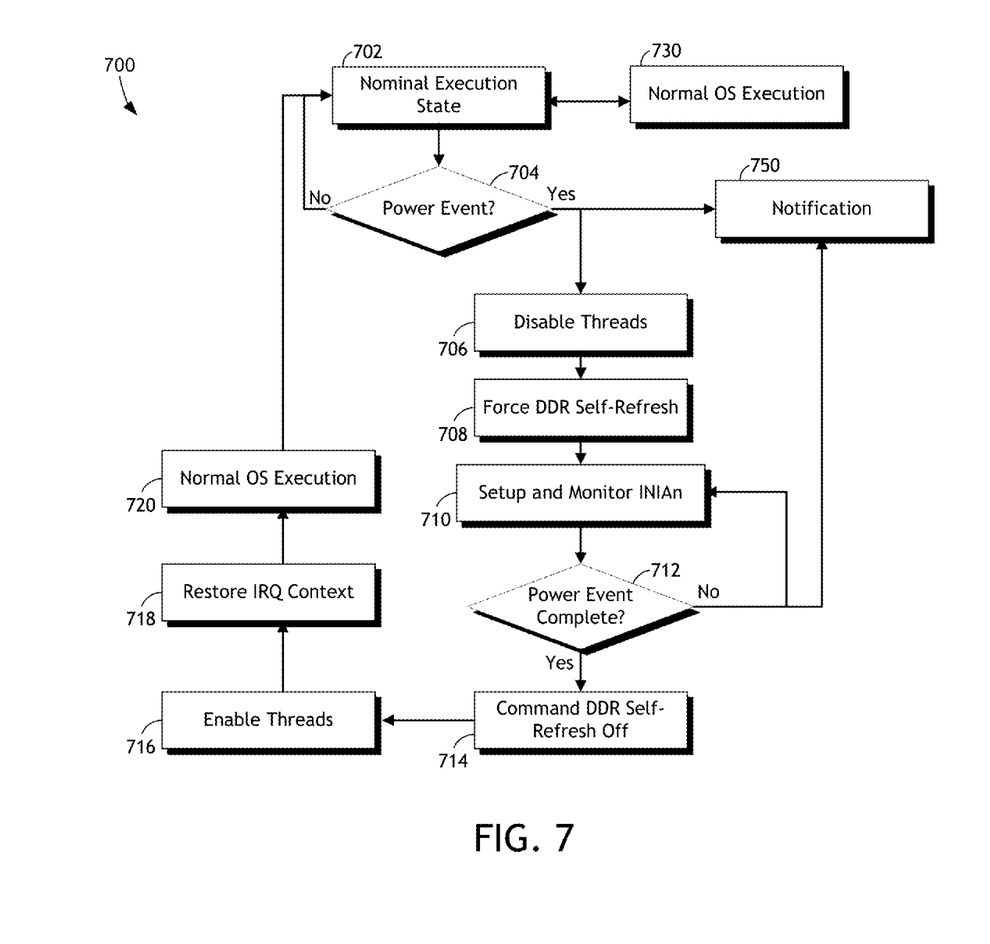
FIG. 7 is a logic flow diagram of a method for thread based power warning monitor in accordance with one embodiment of the inventive concepts disclosed herein.

Referring to FIG. 7, a logic flow diagram of a method for thread based power warning monitor in accordance with one embodiment of the inventive concepts disclosed herein is shown. Method flow 700 may include a step 702 of nominal execution state with an associated normal OS execution at a step 730. A query 704 may determine if a power warning IRQ is received and if the result of query 704 is negative, the logic flow may proceed to the nominal execution step 702. However, should the result of query 704 be positive, the method flow 700 may proceed to a step 706 of disabling each thread as well as a notification step 750 to notify an operator of the power warning event.

The method flow 700 may include a step 708 forcing the DDR controller into a self-refresh mode and a step 710 of a setup and monitoring of the thread INIA. The method flow 700 may query 712 to determine if the power event is complete, and should the result be negative, the method may return to the event monitor step 710 as well as proceed to the notification step 750 to provide an additional notification. Should the result of the query 712 be positive, the method flow 700 may proceed to a step 714 to command the DDR out of self-refresh, to enable each thread at a step 716, and restore the IRQ context to each thread at a step 718 and restoring normal OS execution at a step 720, and returning to the nominal execution state 702.

Figure 8:
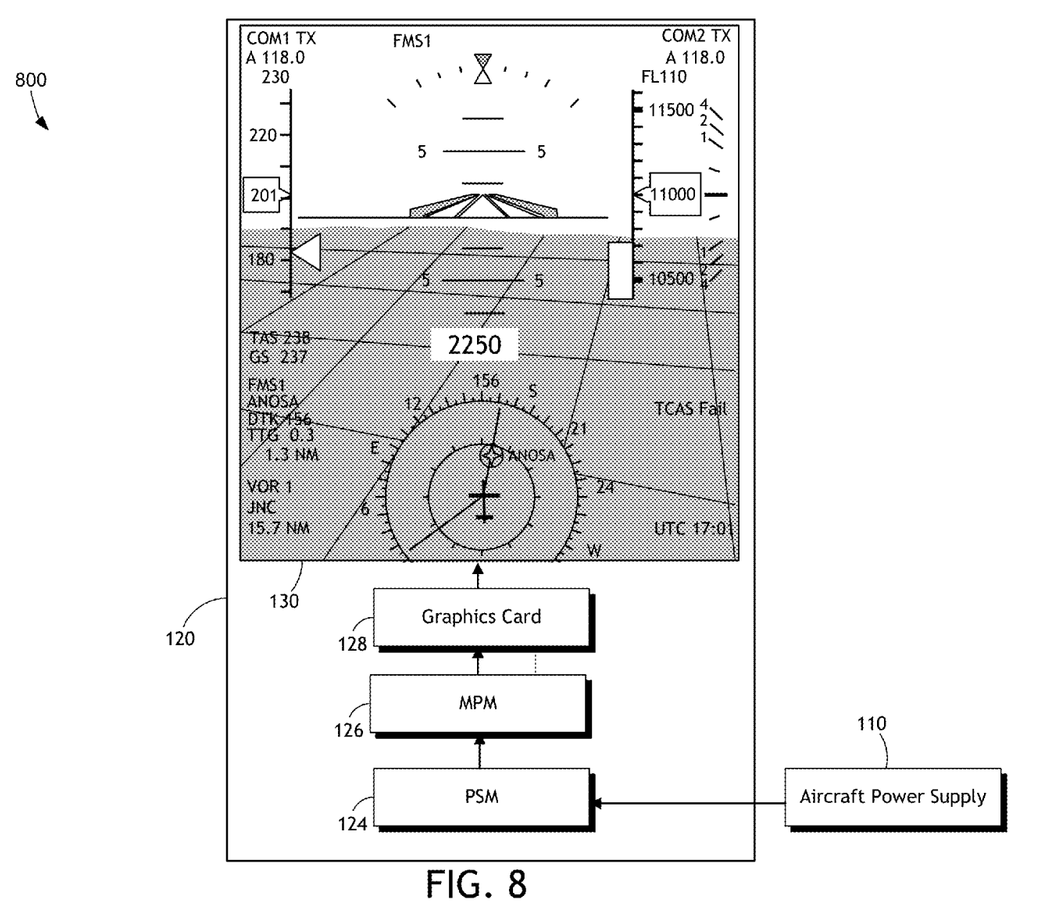
FIG. 8 is a diagram of an exemplary embodiment of the inventive concepts disclosed herein applied to a cockpit of an aircraft.

Referring to FIG. 8, an aircraft cockpit diagram 800 of an exemplary application of the system 100 is shown. The aircraft power supply 110 may supply electrical power to the mission critical display system 120 via the PSM 124. The MPM 126 may receive the electrical power and process commands stored with the core platform cache 212 and the DDR memory controller 214. The graphics card 128 may configure MPM 126 generated signals specifically for the display screen 130.

Figure 9:
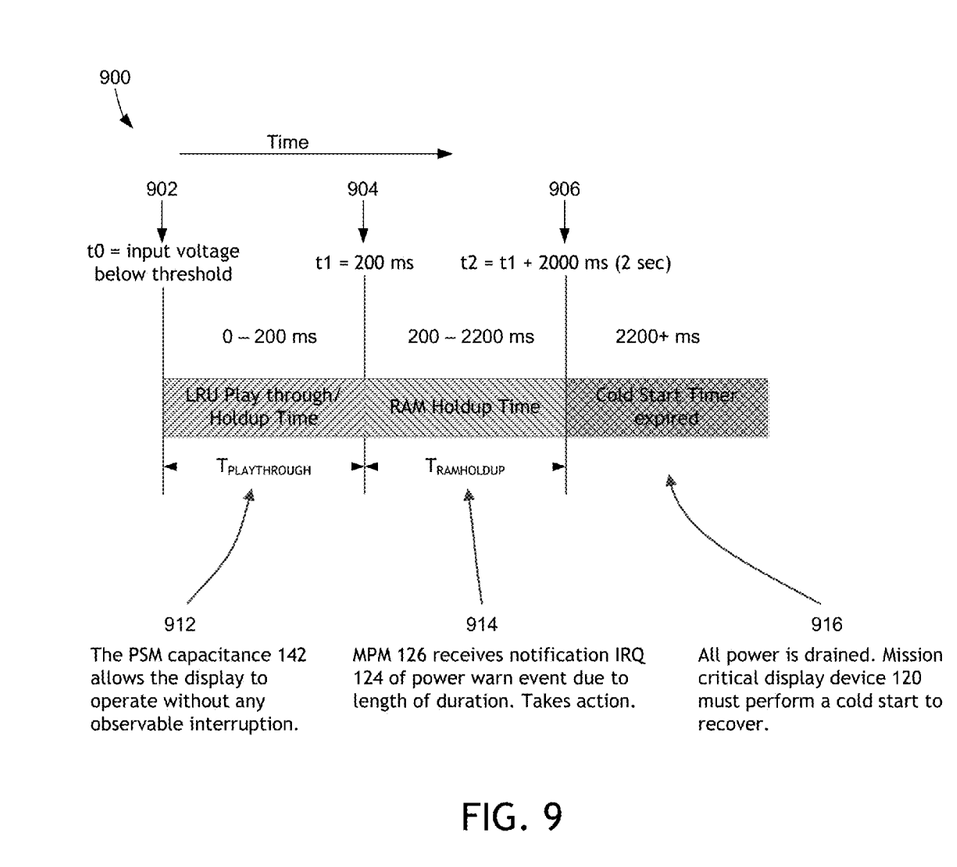
FIG. 9 is a diagram of an exemplary timeline applicable to one embodiment of the inventive concepts disclosed herein.

Referring to FIG. 9, an exemplary timeline 900 of one embodiment of inventive concepts disclosed herein is shown. As time increases from left to right, the mission critical display system 120 electrical power may progress from fully powered on the left to a state of zero power on the right. At time0 902 a power event may be sensed by the PSM 122. Here an indication of an input voltage below a threshold may be one anomaly the system 100 may sense and operate to ensure the mission critical display remains functional. For a period of time after time0 902 the MPM 126 may operate in an LRU holdup mode 912 to continue operation. During the LRU holdup mode 912, the capacitance 142 may allow the mission critical display device 120 to operate without an observable interruption by the operator.

At a time1 904, an exemplary 200 ms, the PWM 146 may operate to ensure the mission critical display device 120 remains available to the operator. The RAM holdup time 914 may indicate the time in which the PWM 146 is in operation to maintain the MPM 126 operation. Should the power supply 110 resume at any time during the LRU holdup time 914, the mission critical display device 120 may return to a normal operation state.

At a time2 906, indicated as an exemplary 2200 ms, the power event has not ended and the PWM 146 is unable to continue operation of the mission critical display device 120. Here, a cold start is required for the mission critical display device 120 to resume normal operation.

Conclusion

Specific blocks, sections, devices, functions, processes and modules may have been set forth. However, a skilled technologist will realize that there are many ways to partition the system, and that there are many parts, components, processes, modules or functions that may be substituted for those listed above.

Skilled artisans will recognize that the state of the art has progressed to the point where there may be little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs.

Additionally, implementations of embodiments disclosed herein may include executing a special-purpose instruction sequence or invoking circuitry for enabling, triggering, coordinating, requesting, or otherwise causing one or more occurrences of virtually any functional operations described herein.

While particular aspects of the inventive concepts disclosed herein have been shown and described, it will be apparent to those skilled in the art that, based upon the teachings herein, changes and modifications may be made without departing from the inventive concepts described herein and their broader aspects and, therefore, the appended claims are to encompass within their scope all such changes and modifications as are within the true spirit and scope of the subject matter described herein.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently.

What is claimed is:

1. A system for mission critical processor power event recovery, comprising:
    a mission critical processor configured for controlling a mission critical display, the mission critical processor including at least one core processor powered by a mission critical processor power supply;
    a first memory source coupled with the mission critical processor and storing non-transitory processor readable program code to cause the mission critical processor to execute a normal operation of the mission critical display;
    a power warning monitor coupled with the mission critical processor and with the first memory source, and configured for receiving an indication of a power anomaly in the mission critical processor power supply;
    a capacitive power source coupled with the mission critical processor power supply, the capacitive power source configured for powering the mission critical processor and the power warning monitor during the power anomaly;
    at least one second memory source coupled with the power warning monitor and storing non-transitory processor readable program code to cause the power warning monitor to execute a power event operation and recovery of the mission critical processor during the power anomaly, the at least one second memory source separate from the first memory source;
    the power warning monitor further configured for:
        accessing the non-transitory processor readable program code from the first memory source and the at least one second memory source;
        receiving the indication of the power anomaly;
        notifying a user of the mission critical display of the power anomaly;
        saving to the at least one second memory source an execution context of at least one thread associated with the at least one core processor;
        redirecting the at least one thread to receive commands from the at least one second memory source;
        commanding the at least one thread to enter a power warning loop to preserve a status of the at least one thread;
        forcing the first memory source to execute a self-refresh;
        monitoring 1) the mission critical processor power supply for an end to the power anomaly and 2) a level of the capacitive power source;
        sensing an indication of the end to the power anomaly;
        when the monitoring reveals the end to the power anomaly:
            forcing the first memory source to cease the self-refresh;
            redirecting the at least one thread to receive commands from the first memory source;
            restoring the at least one thread with the saved execution context; and
            restoring the mission critical display with information processed by the at least one thread.

2. The system for mission critical processor power event recovery of claim 1, wherein the mission critical processor is a multi-core processor including at least two core processors, each core processor of the at least two core processors further including at least one thread.

3. The system for mission critical processor power event recovery of claim 1, wherein receiving an indication of a power anomaly further comprises receiving an indication from a hardware based interrupt request (IRQ).

4. The system for mission critical processor power event recovery of claim 1, wherein the user is a flight crewmember and the mission critical display is a primary flight display for controlling an aircraft.

5. The system for mission critical processor power event recovery of claim 1, wherein the power anomaly is one of a voltage anomaly, a phase anomaly, and a frequency anomaly, and further including notifying the user of an exhaustion of the mission critical display before the level of the capacitive power source is zero.

6. The system for mission critical processor power event recovery of claim 1, wherein the execution context includes at least one parameter associated with a normal operation of the at least one thread.

7. The system for mission critical processor power event recovery of claim 1, wherein the first memory source is a memory controller supporting a self-refresh functionality and the at least one second memory source is at least one of: a core platform cache management static random access memory, a NOR flash read-only memory, a NAND flash memory, a magnetoresistive random-access memory, and a static RAM module.

8. The system for mission critical processor power event recovery of claim 1, wherein the power warning monitor is a field programmable gate array associated with the mission critical processor.

9. A method for mission critical processor power warning, comprising:
  monitoring a mission critical processor power supply for a power anomaly, the mission critical processor power supply coupled with a mission critical processor configured for controlling a mission critical display, the monitoring via a power warning monitor coupled with the mission critical processor;
  receiving an indication of the power anomaly;
  notifying a user of the mission critical display of the power anomaly;
  saving to at least one second memory source an execution context of at least one thread associated with at least one mission critical processor, the at least one second memory source configured for storing non-transitory processor readable program code to cause the power warning monitor to execute a power event operation and recovery of the mission critical processor during the power anomaly, the at least one second memory source separate from a first memory source, the first memory source configured for storing non-transitory processor readable program code for causing the mission critical processor to execute a normal operation of the at least one thread;
  redirecting the at least one thread to receive commands from the at least one second memory source;
  commanding the at least one thread to enter a power warning loop to preserve a status of the at least one thread;
  forcing the first memory source to execute a self-refresh;
  monitoring 1) the mission critical processor power supply for an end to the power anomaly and 2) a level of a capacitive power source, the capacitive power source powering the mission critical processor and the power warning monitor during the power anomaly;
  sensing an indication of the end to the power anomaly;
  when the monitoring reveals the end to the power anomaly:
    forcing the first memory source to cease the self-refresh;
    redirecting the at least one thread to receive commands from the first memory source;
    restoring the at least one thread with the saved execution context; and
    restoring the mission critical display with information processed by the at least one thread.

10. The method for mission critical processor power warning of claim 9, wherein the mission critical processor is a multi-core processor including at least two core processors, each core processor of the at least two core processors further including at least one thread.

11. The method for mission critical processor power warning of claim 9, wherein receiving an indication of a power anomaly further comprises receiving an indication from a hardware based interrupt request (IRQ).

12. The method for mission critical processor power warning of claim 9, wherein the user is a flight crewmember and the mission critical display is a primary flight display for controlling an aircraft.

13. The method for mission critical processor power warning of claim 9, wherein the power anomaly is one of a voltage anomaly, a phase anomaly, and a frequency anomaly, and further including notifying the user of an exhaustion of the mission critical display before the level of the capacitive power source is zero.

14. The method for mission critical processor power warning of claim 9, wherein the execution context includes at least one parameter associated with a normal operation of the at least one thread.

15. The method for mission critical processor power warning of claim 9, wherein the first memory source is a memory controller supporting a self-refresh functionality and the at least one second memory source is at least one of: a core platform cache management static random access memory, a NOR flash read-only memory, a NAND flash memory, a magnetoresistive random-access memory, and a static RAM module.

16. A method for multiple core processor power event recovery, comprising:
  monitoring a mission critical processor power supply for a power anomaly, the mission critical processor power supply coupled with a mission critical multi-core processor, the mission critical multi-core processor configured for controlling a mission critical display;
  designating a primary thread associated with at least one core of the mission critical multi-core processor as a power warning monitor;
  the power warning monitor configured for executing non-transitory processor readable program code stored within at least one second memory source during the power anomaly, the non-transitory processor readable program code including the steps of:
  receiving an indication of the power anomaly;
  notifying a user of the mission critical display of the power anomaly;
  saving to the at least one second memory source an execution context of at least one local thread associated with the mission critical multi-core processor, the at least one second memory source configured for storing non-transitory processor readable program code to cause the power warning monitor to execute a power event operation and recovery of the mission critical multi-core processor during the power anomaly, the at least one second memory source separate from a first memory source, the first memory source configured for storing non-transitory processor readable program code to cause the mission critical processor to execute a normal operation of the at least one local thread;
  redirecting the at least one local thread to receive commands from the at least one second memory source;

commanding the at least one local thread to enter a power warning loop to preserve a status of the at least one local thread;

forcing the first memory source to execute a self-refresh;

monitoring 1) the mission critical processor power supply for an end to the power anomaly and 2) a level of a capacitive power source, the capacitive power source configured for powering the power warning monitor during the power anomaly;

sensing an indication of the end to the power event;

forcing the first memory source to cease the self-refresh;

redirecting the at least one local thread to receive commands from the first memory source;

restoring the at least one local thread with the saved execution context; and restoring the mission critical display with information processed by the at least one local thread.

17. The method for multiple core processor power event recovery of claim 16, wherein the user is a flight crewmember and the mission critical display is a primary flight display for controlling an aircraft.

18. The method for multiple core processor power event recovery of claim 16, wherein the power anomaly is one of a voltage anomaly, a phase anomaly, and a frequency anomaly, and further including notifying the user of an exhaustion of the mission critical display before the level of the capacitive power source is zero.

19. The method for multiple core processor power event recovery of claim 16, wherein the execution context includes at least one parameter associated with a normal operation of the at least one thread.

20. The method for multiple core processor power event recovery of claim 16, wherein the first memory source is a memory controller supporting a self-refresh functionality and the at least one second memory source is at least one of: a core platform cache management static random access memory, a NOR flash read-only memory, a NAND flash memory, a magnetoresistive random-access memory, and a static RAM module.

* * * * *